Sept. 25, 1951     I. A. GREENWOOD, JR., ET AL     2,569,164
VARIABLE SWEEP CIRCUIT
Filed Sept. 23, 1949
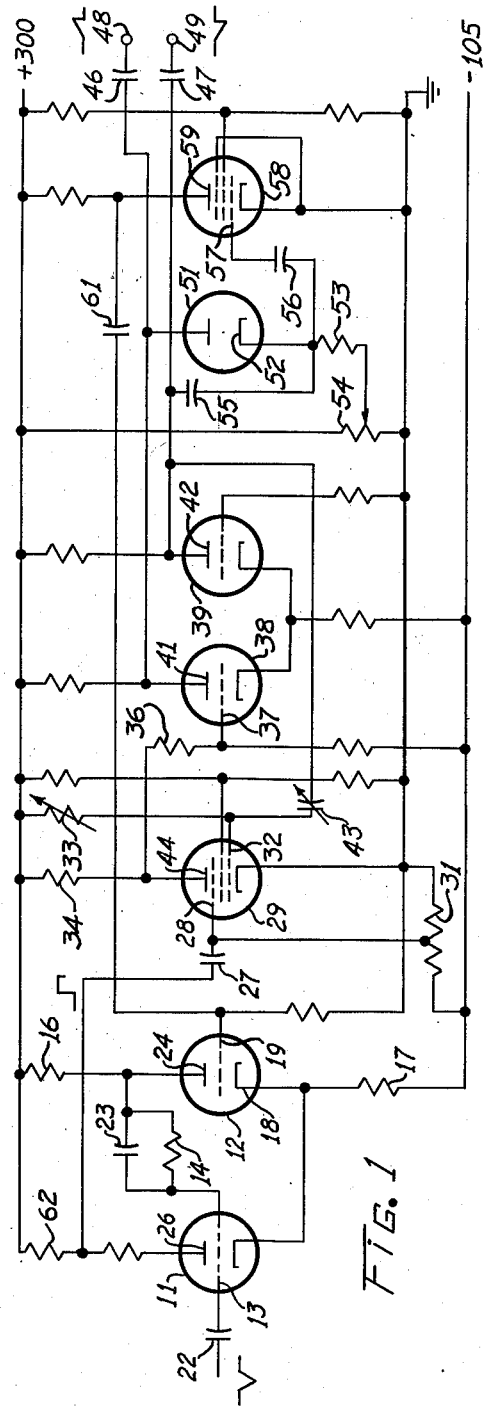
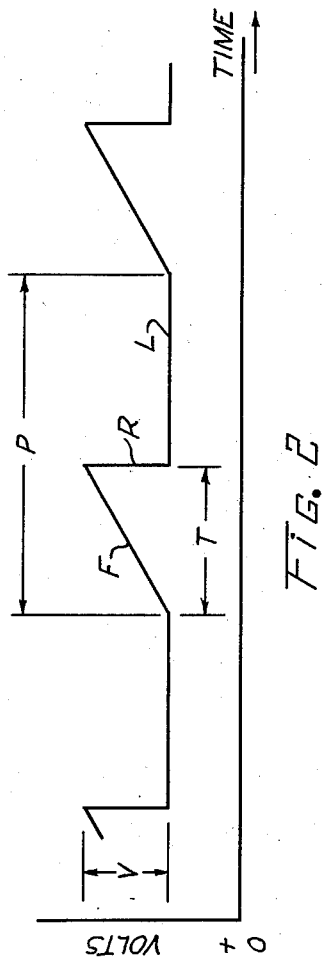
Inventor
IVAN A. GREENWOOD JR.
JULIAN D. HIRSCH
By H. I. Mackey
Attorney Patented Sept. 25, 1951

2,569,164

UNITED STATES PATENT OFFICE 2,569,164

VARIABLE SWEEP CIRCUIT

Ivan A. Greenwood, Jr., Pleasantville, and Julian D. Hirsch, New Rochelle, N. Y., assignors to General Precision Laboratory Incorporated, a corporation of New York Application September 23, 1949, Serial No. 117,482

9 Claims. (Cl. 250—27)

1

This invention relates to a variable sweep circuit and more specifically to an improved circuit for producing an output potential of sawtooth form.

The main purpose of the present invention is to provide an improved sweep circuit having a wide range of variation of sweep speed at constant amplitude for any given triggering frequency. This circuit is capable of producing a linear sweep in which the peak voltage is constant. In the present invention the maximum value of the sweep voltage pulse is predetermined and this value is used as the reference level which determines the termination of this pulse.

Heretofore it has been common to produce sawtooth waveforms by the use of resistance-capacitance circuits. The main disadvantage of this type of previous circuit is that the voltage rise with respect to time is approximately exponential in form. Other types of saw-tooth wave generators are known in which a substantially linear rate is obtained but the range of the variation of the rate is limited. In these prior devices the sweep cycle occupies substantially the entire triggering cycle period, a clipper being utilized to discard the unwanted portion of the sweep voltage. Therefore it has been practically impossible to vary the sweep speed independently of the maximum voltage and the frequency of the sweep pulses. Also, when the repetition frequency is low and a large range of control is required, the range has to be changed in steps and the control of the rate is therefore discontinuous.

According to the present invention, a predetermined maximum potential of the sweep voltage, which is variable, serves as the reference level. After the sweep voltage reaches its predetermined maximum it returns abruptly to its minimum value and remains there until the next timing pulse initiates the next sweep cycle. The initiation of the sweep voltage cycle substantially coincides in time with the triggering pulse. The sweep speed or rate is determined by the setting of the sweep circuit control, and the maximum voltage is predetermined by a control unit connected to the output of the sweep generator.

It will be readily apparent that since the maximum peak voltage is used as the reference level, the voltage will reach this level quicker for high sweep speeds than for low sweep speeds. Therefore the sweep speeds can be continuously varied over a very large portion of the period of the repetition frequency without any variation in maximum voltage or frequency of the sweep pulses. The present invention utilizes a high gain

2 degenerative feedback loop circuit in which the grid swing is substantially zero over the entire range of the sweep pulse and therefore the sweep rate is linear.

Another object is therefore to provide an improved sweep generator capable of producing a sweep voltage which is linear within very narrow limits.

Another purpose is to provide such an improved sweep circuit in which the sweep speed can be continuously varied over a wide range without affecting the repetition rate or the maximum sweep voltage.

Still another object is to provide an improved circuit of the type described having a push-pull output.

Other and further objects will become readily apparent from the following description when considered in connection with the accompanying drawings, in which:

Figure 1 is a schematic circuit diagram of a sweep circuit in accordance with the present invention; and Figure 2 illustrates waveform produced by the generator of the present invention.

Generally speaking, the present invention comprises a sweep circuit which includes a multivibrator or gate generator which feeds a sweep generator, the output of which is connected to a control unit which determines the peak of the sweep voltage and supplies a control signal for returning the multivibrator unit to its quiescent state. A suitable source of control pulses is utilized in a conventional manner to trigger the multivibrator circuit. The multivibrator feeds directly into the sweep generator which includes a degenerative feedback loop differential power amplifier which provides suitable push-pull output sweep voltages. The high feedback during the sweep gives excellent linearity. The control unit controls the maximum output by supplying a control pulse to terminate the gating pulse, thus cutting off the voltage supply to the timing circuit and returning the multivibrator to the quiescent state. A resistance-capacitance circuit connected to the output of the differential amplifier constitutes the timing circuit.

An illustrative embodiment of the present invention shown in the schematic diagram of Fig. 1 comprises a "flip-flop" multivibrator or gate generator, which includes the triodes 11 and 12. The pentode 29 serves as a gate amplifier which feeds a differential amplifier comprising the triodes 38 and 39. A control unit comprises the diode 51 and the pentode 58. An incoming trigger pulse fed into the multivibrator energizes the timing circuit and initiates the sweep cycle and the control circuit terminates the timing cycle at the predetermined maximum value of the sweep voltage. The setting of the timing circuit determines the sweep speed or rate of increase of the sweep voltage. The sweep generator, in effect, constitutes a time delay circuit which supplies a pulse through the control unit to terminate the gate amplifier pulse and return the multivibrator to its quiescent state.

The cathodes of the multivibrator triodes 11 and 12 are connected together and are biased through a common resistor 17. The control grid 13 of the triode 11 is connected through the resistor 14 and an anode resistor 16 to the positive side of a source of plate potential. The triode 11 is normally biased above cutoff so that current flows in its anode circuit when no signal is being received. The voltage drop through the common cathode resistor 17 is such that under this condition the cathodes of the tubes 11 and 12 are about 22 volts above ground, so that a bias below cutoff is impressed on the triode 12 and during the quiescent state no current flows through the anode circuit of the tube 12.

The input control signal for triggering the sweep generator may consist of either a single pulse or a succession of pulses received periodically or aperiodically and the form of the pulses is immaterial. Preferably, the present circuit is designed to utilize negative triggering pulses of about 100 volts maximum. These triggering pulses may be supplied by a suitable triggering generator (not shown) or other suitable source and be applied to the grid 13 through a coupling condenser such as that shown at 22. The design of the multivibrator circuit is such that a negative pulse applied to the grid 13 initiates regenerative action that transfers the multivibrator current from the triode 11 to the triode 12. This regenerative action is initiated when a triggering pulse causes reduction of the plate current in the triode 11 which in turn reduces the voltage drop in the cathode resistor 17, thereby decreasing the negative bias on triode 12 and initiating anode current in the latter tube. When current flows through the anode circuit of tube 12 the resulting potential drop through the resistor 16 lowers the potential of the anode 24 which is transmitted as a negative pulse through the condenser 23 to the grid 13 thereby abruptly further decreasing the anode current through triode 11, which decrease of current was initiated by the negative control pulse through the condenser 22. The recovery of the grid voltage 13 then takes place at a rate which is a function of the product of the capacitance 23 and its shunt resistance 14. The grid 13 progressively returns to the potential of the anode 24 but the controlling time constant is large, so that when using triggering frequencies of a few hundred cycles per second or less, the recovery time is much greater than the triggering period.

It will be readily understood from the above that since the triode 11 normally has current flowing through it, the interruption of the flow of this current will result in an amplified positive potential pulse at the anode 26 of the triode 11. This positive pulse is fed through a large coupling condenser 27 to the suppressor grid 28 of the pentode gating amplifier 29. Normally this pentode is biased to cutoff, the bias being provided by connecting the grid 28 to the voltage divider 31. The control grid 32 is given a positive bias by being connected through the resistor 33 to the positive side of the plate supply, but this positive voltage on the control grid 32 is not sufficient to overcome the effect of the negative bias on the grid 28 so that normally no current flows through the anode circuit. The positive pulse fed to the suppressor grid 28 through condenser 27 initiates a current flow in the anode circuit of tube 29 producing a potential drop in the anode resistor 34 which potential drop in turn constitutes a negative signal which is impressed through resistor 36 on the grid 37 of the triode 38. The triode 38 together with the triode 39 constitutes a direct current differential amplifier, both of these tubes being normally biased slightly above cutoff.

Since the triodes 38 and 39 constitute a differential amplifier, it will be understood that a negative signal applied to the grid of the triode 38 produces an amplified positive signal at its anode 41 and a similar signal of negative polarity at the anode 42 of triode 39. The negative signal from the anode 42 is fed through condenser 43 to control grid 32 of the high gain pentode 29. This circuit constitutes a degenerative feedback connection so that the small negative signal applied to the control grid 32 of the triode 29 results in a reduction of the negative potential that would otherwise be applied to the control grid 37 of triode 38 through a resistor 36. Because the gain of the amplifier unit, comprising the pentode 29 and the triodes 38 and 39, is very high, only an extremely small change in the potential applied to the control grid 32 is necessary in order to cause a large change of potential at the anodes 41 and 42, respectively, of the triodes 38 and 39. Accordingly, since the grid swing in tube 29 is very small, the latter operates on the linear portion of its curve and excellent linearity of the sweep voltage curve is provided. In effect, the output of tube 29 provides a source of substantially constant current that is used to charge the timing circuit, which includes the resistance 33 and the capacitance 43, and it is for this reason that the present circuit provides high linearity.

The anodes 41 and 42 of the triodes 38 and 39 are respectively coupled through condensers 46 and 47 to output terminals 48 and 49, which may be connected to any suitable utilization circuit. These two terminals can be used, if desired, as a push-pull output, such a push-pull output being useful, for example, to actuate the horizontal sweep of an electrostatically controled cathode ray tube, the advantage of the push-pull voltage being that it does not substantially alter the focus of the cathode ray beam.

As previously mentioned, the maximum sweep voltage is maintained at a constant value and is used as a reference level with respect to which the termination of the sweep voltage is determined.

To this end, the diode 51 is connected to the output circuit of the triode 41. The cathode 52 is connected through the resistor 53 to voltage divider 54. The voltage divider 54 may be in the form of a potentiometer to provide an adjustable bias for the diode 51. The cathode is also connected to the control grid 57 of pentode 59 through the condenser 56. The anode 59 of the pentode 58 is connected by means of a condenser 61 to the control grid 19 of the triode 12. When the potential of the anode 41 of the triode 38 exceeds the value at which the diode 51 is biased, current flows through the diode and a positive pulse of potential is impressed through the condenser 56 onto the grid 57 of the pentode 58. The pentode 58 amplifies and inverts this pulse and feeds it back as a negative pulse from its anode 59 through the condenser 61 to the control grid 19 of the multivibrator triode 12. The triode 12 is conductive at this time, having been turned on by the incoming control signal impressed through the condenser 22 and the negative pulse from pentode 59 on the grid 19 cuts off the anode current of triode 12 thus restoring the multivibrator to its stable state with steady current flowing in the triode 11. The initiation of anode current in the triode 11 produces a potential drop in the anode resistor 62, resulting in a negative pulse that is transmitted through the condenser 27 to the grid 28 of the pentode 29, thereby terminating its gate and thus restoring normal input conditions to the differential amplifier triodes 38 and 39.

It will be readily seen from the schematic diagram that the internal capacity of diode 51 is effectively between one side of the push-pull amplifier output and ground. In order to produce a negative sweep symmetrical with the positive sweep, a suitable condenser 55 is connected between the anode 42 of triode 39 and the cathode of diode 51, the capacity of condenser 55 being of such value as to neutralize the effect of the internal capacity of the diode. This will cause the negative or return sweep voltage curve to be of the same shape as that of the positive sweep.

The operation of this saw-tooth generator is illustrated in Fig. 2 wherein the time axis is the abscissa and the voltage is represented along the ordinate axis. The triggering control signal is represented as a recurring pulse having a period P. The slope of the front edge F of the waveform, measured in volts per second, represents the sweep speed. It will be noted that the peak of the sweep voltage is constant, the maximum points constituting the reference level, as previously mentioned. By adjustment of either or both of the elements of the timing circuit, that is, the resistor 33 and the condenser 43, the slope of the curve F can be readily controlled. The left hand side of the edge F of the waveform coincides in time substantially with the control pulse. By varying the value of the resistor 33 or the condenser 43, or both, the length of time interval necessary for the sweep voltage to reach the maximum predetermined value represented at R, the latter value being determined by the diode limiter. It will be readily apparent that the faster the condenser charges the steeper will be the slope of the front edge F and vice versa. In a practical embodiment of the present invention it was found that this slope could be varied over a range at least as great as 100 to 1 expressed in terms of volts per microseconds. This provides a range of control of at least 100 to 1. The termination of the gating pulse by the control unit is represented by the trailing side R of the sweep voltage curve.

It would be understood from the foregoing description that the present invention provides an improved saw-tooth generator in which the rate is always linear and in which the range of control is continuous. It will also be seen that a very large range of variation of sweep speed is possible and that the variation does not alter the peak voltage nor the repetition frequency. Although the present invention has been described in detail it will be apparent to those skilled in the art that changes can be made without departing from the spirit of the invention.

What is claimed is:

1. A sweep circuit comprising a gate generator, a sweep generator, circuit means including a degenerative feedback loop for controlling the sweep speed of said sweep generator and a control unit connected to the output of said sweep generator, said control unit including an amplitude comparison circuit for terminating gating pulses from said gate generator.

2. A sweep circuit comprising a gate generator, a sweep generator, a source of control signals connected to the input of said gate generator, the period of said gate generator being at least as long as the period of the control frequency, circuit means including a degenerative feedback loop for controlling the sweep speed of said sweep generator, a control unit including an amplitude comparison circuit connected to the output of said sweep generator for controlling the termination of a gating pulse from said gate generator.

3. A sweep circuit comprising a gate generator, a sweep generator having a relatively long period and being adapted to be turned on by external control signals and to be turned off by a delayed signal initiated by one of said control signals, a degenerative feedback loop for controlling the sweep speed of said sweep generator, and circuit means including an amplitude comparison circuit connected between the output of said sweep generator and said gate generator for terminating sweep pulses from said sweep generator.

4. A sweep circuit comprising a gate generator, a sweep generator having a relatively long period and being adapted to be turned on by an external signal and to be turned off by delayed signal initiated by said control signal, a degenerative feedback loop for controlling the sweep speed of said sweep generator, and a controlling unit including an amplitude comparison circuit connected to the output of said sweep generator for impressing a signal of predetermined value on said gate generator to terminate the operation of the latter.

5. A variable sweep circuit comprising, an electronic sweep generator of the negative feedback type, an electronic start-stop switch adapted for being turned on by an electric starting signal and adapted for being turned off by attainment of a predetermined sweep potential, a feedback connection from said generator to said switch for turning off said switch, and adjustable means in the negative feedback loop of said generator for varying the sweep speed thereof.

6. A variable sweep circuit comprising, an electronic sweep generator having a negative feedback loop having a push-pull output sweep potential, an electronic start-stop switch adapted to be turned off upon attainment by said sweep generator of predetermined output sweep potential, a feedback connection from said generator to said switch for turning off said switch, a first generator output terminal for positive sweep potentials, a second generator output terminal for negative sweep potentials whereby a push-pull output potential may be secured to said first generator output terminal, and adjustable means in said negative feedback loop of said generator for varying the sweep speed thereof.

7. A sweep circuit comprising a sweep generator including a gating amplifier and a push-pull amplifier connected to the output of said gating amplifier, a timing circuit connected between the output of said push-pull amplifier and said gating amplifier and constituting a degenerative feedback loop circuit and an amplitude comparison circuit connected to the output of said push-pull amplifier for terminating the feedback through said degenerative timing circuit.

8. A sweep circuit comprising a gate generator, a sweep generator, a source of control signals connected to the input of said gate generator, the period of said gate generator being at least as long as the period of the control frequency whereby said sweep generator is triggered on by the control signals, said sweep generator including a gating amplifier and a power output amplifier a timing circuit connected between the output of said power amplifier and said gating amplifier and constituting a degenerative feedback loop circuit for triggering off said gate generator.

9. A sweep circuit comprising a gate generator, a sweep generator, a source of control signals connected to the input of said gate generator, the period of said gate generator being at least as long as the period of the control frequency whereby said sweep generator is triggered on by the control signals, said sweep generator including a gating amplifier and a power output amplifier a timing circuit connected between the output of said power output amplifier and said gating amplifier and constituting a degenerative feedback loop circuit for triggering off said gate generator, and an amplitude comparison circuit connected to the output of said second amplifier for controlling the termination of the feedback.

IVAN A. GREENWOOD, JR.
JULIAN D. HIRSCH.

REFERENCES CITED

The following references are of record in the file of this patent:

UNITED STATES PATENTS

| Number | Name | Date |
|---|---|---|
| 2,414,486 | Rieke | Jan. 21, 1947 |
| 2,460,142 | Michel | Jan. 25, 1949 |